US008995976B2

(12) United States Patent
Mian et al.

(10) Patent No.: US 8,995,976 B2
(45) Date of Patent: Mar. 31, 2015

(54) EMBEDDING SERVICE PROVIDER INFORMATION IN A WIRELESS CALL

(71) Applicant: Intel Corporation, Santa Clara, CA (US)

(72) Inventors: Mubashir A. Mian, Santa Clara, CA (US); Rita H. Wouhaybi, Portland, OR (US); Stanley Mo, Hillsboro, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/676,462

(22) Filed: Nov. 14, 2012

(65) Prior Publication Data

US 2014/0134972 A1 May 15, 2014

(51) Int. Cl.
*H04M 3/42* (2006.01)
*H04W 4/16* (2009.01)
*H04W 4/24* (2009.01)
*H04W 4/26* (2009.01)
*H04M 3/00* (2006.01)
*H04M 15/00* (2006.01)

(52) U.S. Cl.
CPC ........ *H04W 4/16* (2013.01); *H04W 4/24* (2013.01); *H04W 4/26* (2013.01); *H04M 3/00* (2013.01); *H04M 15/00* (2013.01); *H04M 3/42093* (2013.01); *H04M 2207/18* (2013.01)
USPC ........... 455/415; 455/406; 455/410; 455/551; 455/414.1

(58) Field of Classification Search
None
See application file for complete search history.

(56) References Cited

U.S. PATENT DOCUMENTS

| 5,940,493 | A  | * | 8/1999  | Desai et al. ............... 379/260 |
| 5,983,115 | A  | * | 11/1999 | Mizikovsky ............... 455/512 |
| 6,697,469 | B1 | * | 2/2004  | Koster ..................... 379/114.29 |
| 8,385,915 | B2 | * | 2/2013  | Petronelli ................. 455/432.1 |
| 2003/0162553 | A1 | * | 8/2003 | Huang et al. ............... 455/458 |
| 2003/0215073 | A1 | * | 11/2003 | Culli et al. ............... 379/121.01 |
| 2006/0234703 | A1 | * | 10/2006 | Wuthnow et al. ........... 455/433 |
| 2007/0015507 | A1 | * | 1/2007  | Petronelli ................. 455/435.2 |
| 2008/0057960 | A1 | * | 3/2008  | Lahtiranta et al. ......... 455/435.2 |
| 2009/0156163 | A1 | * | 6/2009  | Ravishankar et al. ....... 455/406 |
| 2010/0261460 | A1 | * | 10/2010 | Gosselin et al. ........... 455/414.1 |
| 2010/0261461 | A1 | * | 10/2010 | Gosselin et al. ........... 455/414.1 |

(Continued)

FOREIGN PATENT DOCUMENTS

| JP | 07203536   | 8/1995 |
| JP | J132006121512 | 5/2006 |

(Continued)

OTHER PUBLICATIONS

TelephonyManager | Android Developers, "Telephony Manager," http://developer.android.com/reference/android/telephony/TelephonyManager.html, Android 4.2 r1, Date Unknown, 18 pages.

(Continued)

*Primary Examiner* — Mehmood B Khan
(74) *Attorney, Agent, or Firm* — Trop, Pruner & Hu, P.C.

(57) ABSTRACT

In one embodiment, a method includes receiving, in a mobile station of a terminating party, an incoming call and an identifier of a service provider of an initiating party of the incoming call, and displaying information corresponding to the initiating party service provider on a display of the mobile station. Other embodiments are described and claimed.

19 Claims, 4 Drawing Sheets

(56) References Cited

U.S. PATENT DOCUMENTS

| | | | |
|---|---|---|---|
| 2012/0015628 A1 | 1/2012 | Patel | |
| 2012/0174214 A1 | 7/2012 | Huang et al. | |
| 2012/0294429 A1* | 11/2012 | Rae | 379/32.01 |
| 2013/0022193 A1* | 1/2013 | Shafique | 379/229 |

FOREIGN PATENT DOCUMENTS

| | | |
|---|---|---|
| KR | 1020090002808 | 1/2009 |
| KR | 1020090037728 | 4/2009 |

OTHER PUBLICATIONS

International Searching Authority, "Notification of Transmittal of the International Search Report and the Written Opinion of the International Searching Authority," mailed Feb. 21, 2014, in International application No. PCT/US2013/068714.

* cited by examiner

EMBEDDING SERVICE PROVIDER INFORMATION IN A WIRELESS CALL

BACKGROUND

In the United States (and other countries), service providers charge for incoming calls but often will provide free intra-operator calls, in addition to an allocation of minutes that the consumer buys. Many consumers maintain such a plan, and are careful to not run over the current allocation because additional minutes are often expensive.

DETAILED DESCRIPTION

In various embodiments, service provider information can be communicated to a user's mobile station such as a cellular telephone (which in different implementations can be a smartphone, a more basic cellular telephone or other wireless communication device such as a laptop, tablet or netbook computer, smart television or so forth). In addition, this information can be leveraged to provide an indication to the user of the identity of a service provider associated with an incoming call. In this way, the user can understand whether the call may be subject to charge. For example, a determination can be made as to whether an initiating party's service provider is the same as the receiving party's (i.e., the user's) service provider. Based at least in part on this determination, it can further be determined whether the call is free (e.g., based on a service plan of the user) or is subject to billing (e.g., deducted against an allocation of minutes provided to the user per the service plan). In addition, embodiments may provide for user-defined actions to be taken responsive to receipt of an incoming call that could subject the user to additional charges.

Thus using an embodiment of the present invention, the problem of a consumer not knowing if the person they are receiving a call from or calling themselves is a customer of the same network or not can be avoided. This problem increases with number portability where the user can keep the same number but change service provider. Thus the socially awkward question to a caller of: "who is your service provider?" can be avoided.

Figure 1:
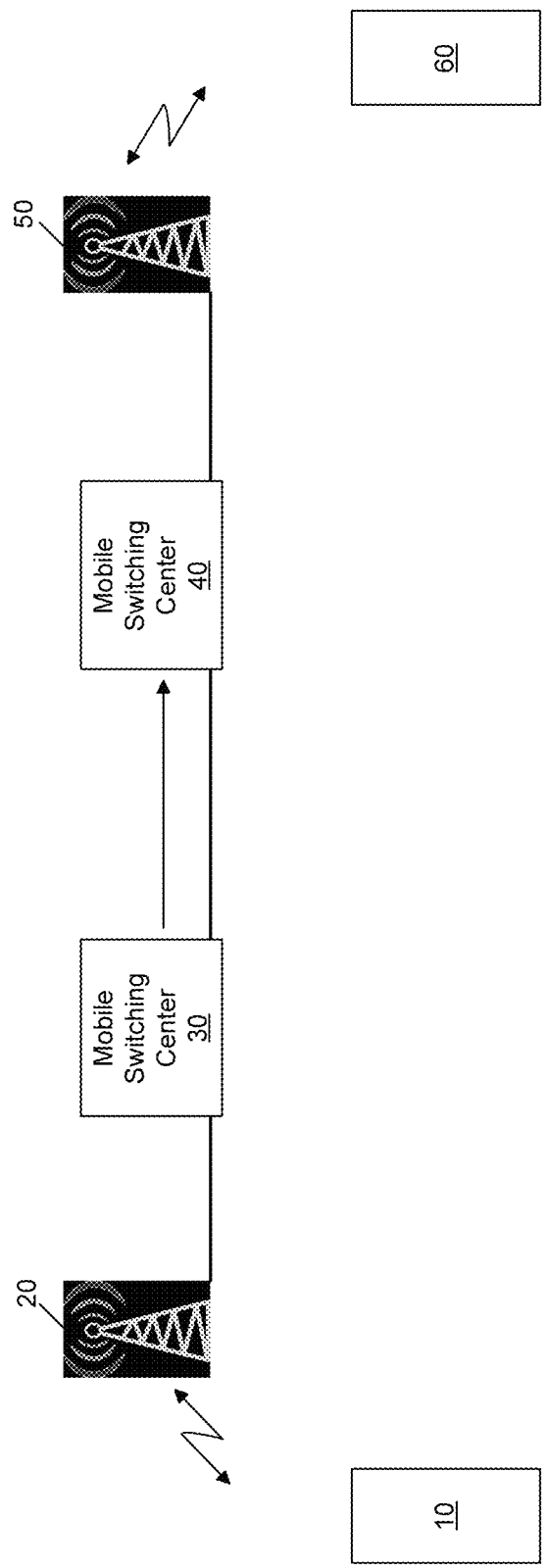
FIG. 1 is a block diagram of a communication path between a pair of communication devices in accordance with one embodiment of the present invention.

Referring now to FIG. 1, shown is a block diagram of a communication path between a pair of communication devices 10 and 60. In the illustration of FIG. 1, both communication devices are cellular telephones; however understand the scope of the present invention is not limited in this regard and in some situations, one or more of the devices may be a land line-based phone or a smart television. Assume that mobile station 10 is associated with a first user that has wireless service through a first service provider (e.g., T-Mobile). To communicate, the user can initiate a call to a called number via mobile station 10.

As seen in FIG. 1, this communication may be via a wireless communication to a base station 20 that receives the communication and routes it to a corresponding mobile telephone switching office (MTSO) such as a mobile switching center (MSC) 30. In the embodiment shown, MSC 30 may be of the initiating user's service provider (namely T-Mobile in this example). To complete a communication to a called party (also referred to herein as a terminating party), various lookup operations can be performed to determine the appropriate destination of the call and the service provider associated with the terminating party.

In the example shown, assume that the called party maintains service through a different service provider (e.g., AT&T in the example of FIG. 1). Accordingly, a communication is made, e.g., via one or more physical trunk lines or other communication means, to a second MSC 40 of this second service provider. In turn, based upon lookups performed within MSC 40, the call can be routed to a base station 50 within a cellular location at which a second user's mobile station 60 is located to thus enable successful termination of the call.

Using an embodiment of the present invention, service provider information can be communicated throughout this communication path and received by the receiving mobile station to thus enable display of this information and/or performance of certain actions based on this information, as will be described further herein. In addition, understand that information regarding the receiving party's service provider can be communicated back to the initiating party's mobile station to enable that party to ascertain the receiving party service provider, which may affect the initiating party's desire to continue the call. Note that although shown at this high level in the embodiment of FIG. 1, the scope of the present invention is not limited in this regard. For example, the mobile stations can exchange service provider information through an off-band mechanism.

In different embodiments, the determination of whether the service providers of the parties are the same or different can occur at various locations of a wireless network. For example, in one embodiment this determination can be made on the mobile stations themselves, e.g., using an application or other software configured to execute on various combinations of hardware, software and/or firmware of the mobile station, which may initiate queries to the network to determine the service provider information. In other embodiments, at least portions of this determination can be made within one or more network entity locations such as within an MSC of a service provider of one or both of the parties to a call.

In an embodiment, this service provider information can be embedded into call information via a MSC, e.g., via service provider identification logic of the MSC. In mobile systems, a system ID (SID) is used by a MSC. The SID, which may be an identifier that is transmitted from a base station over a radio interface and identifies a mobile system, is used by mobile stations to identify systems that they are monitoring. When a mobile station is turned on, it listens for a signal. If it receives a signal, it looks at the SID of the signal and compares it with the one that is stored in the phone. Generally, the MSC via a base station broadcasts a SID and each mobile station has a resident SID stored in the phone. The phone listens to the broadcast SID and determines if it is the SID that is stored on the phone (meaning it is in its home network). Or if the broadcast SID does not match the SID stored on the phone, the phone is in a roaming network.

A terminating MSC can request the SID of the originating network and convey this information in the broadcast message as well. In an embodiment, the MSC broadcasts setup data on a paging channel to its subscribers during a terminating call, where the setup data includes a broadcast page message that includes originating MSC SID and home MSC SID. As such, an MSC can embed service provider information into setup data for a call.

The terminating mobile station deciphers the data as follows: if the home MSC SID matches the SID stored on the phone, this is a determination of not roaming. And, then and if the originating MSC SID (the service provider of the originating caller) and the home MSC ID are the same, it is an intra-service provider call. Thus the mobile station can display the service provider name based on the originating MSC ID, or it can display another such indicator. The same technique can be deployed for an originating caller that seeks to receive the terminating MSC SID. Here, the originating mobile station or the originating MSC can request the SID of the terminating mobile station, which can then be communicated to the originating mobile station during the call setup/alert state to provide the same information.

Figure 2:
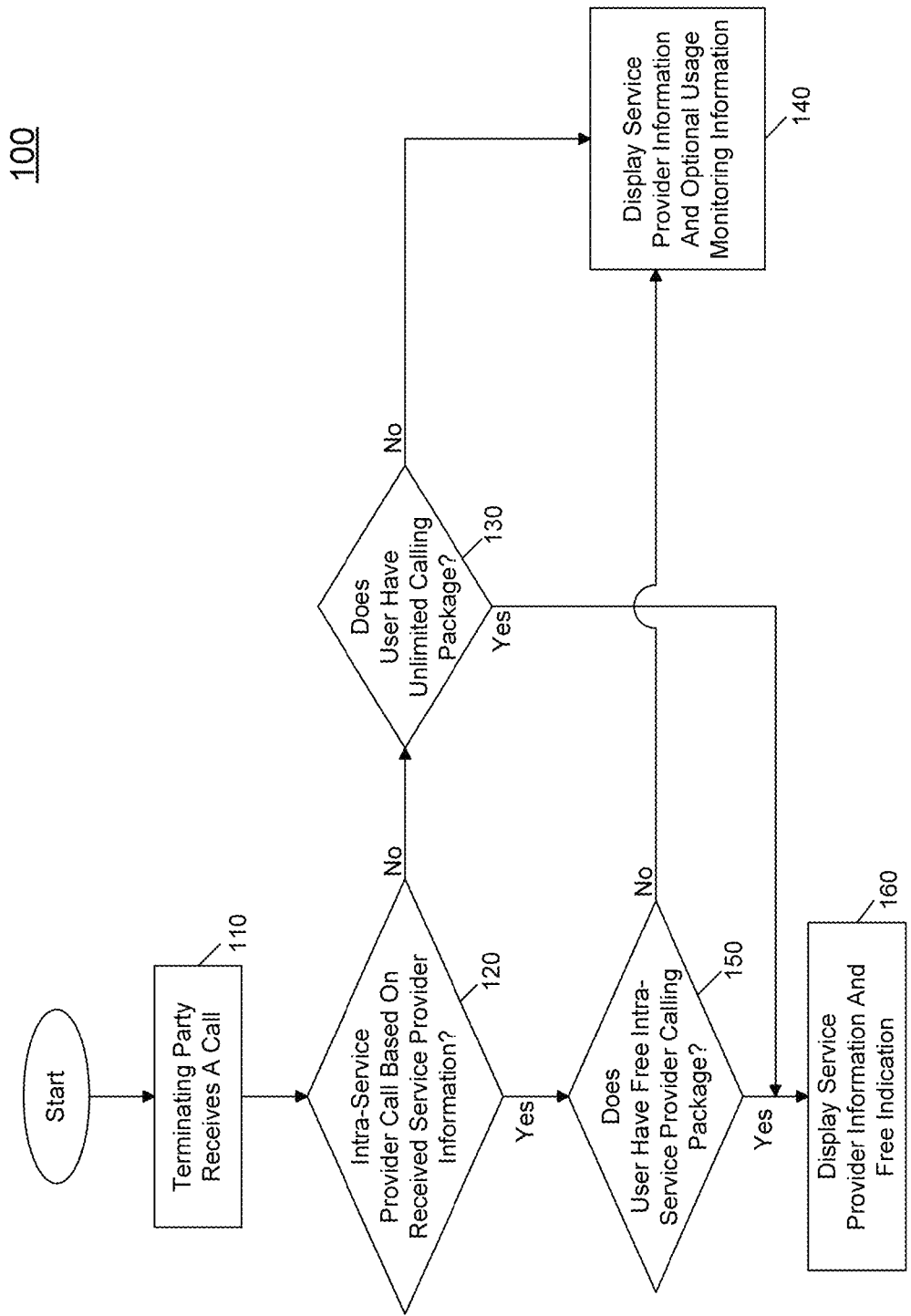
FIG. 2 is a flow diagram of a method for handling service provider information in accordance with an embodiment of the present invention.

Next an example method of leveraging service provider information in wireless communications assumes that the operations are performed within a mobile station itself. Referring now to FIG. 2, shown is a flow diagram of a method for handling service provider information in accordance with an embodiment of the present invention. As shown in FIG. 2, method 100 may be performed by logic within a mobile station, such as processor logic to perform application code. In an embodiment, a user application is used to obtain, process, and present the information. Note that this user application can be downloaded by the user or may be provisioned as part of configuration of a phone.

As seen, method 100 may begin by receiving a call in the mobile station (block 110). More specifically, a terminating party's phone can receive various setup information associated with a call. This information may include an incoming telephone number, as well as identification of the caller (where caller ID functionality is present), along with other identification and configuration information. In addition, an indication of the initiating party's service provider may also be included as part of this setup information. As one such example, on an ANDROID™-based phone, a method termed getNetworkOperatorName ( ) is called to obtain this information.

In one embodiment, this service provider information may be obtained in a mobile switching center such as MSC 30 in FIG. 1. To this end, MSC 30 (and also MSC 40) may include service provider extraction logic to obtain service provider information from an incoming communication originating with the initiating party. Accordingly, the MSC can embed this service provider information within data of the call. In an embodiment, this information may be included in setup data communicated to the terminating party's mobile station. Assuming a common central repository of emergency numbers exists, the correct and local emergency number can be added or replaced in a stream as a dynamic function as the call moves through the local MSC, so long as the emergency number can easily be tagged as such and identified by the local service provider.

Different manners of presenting this service provider information may occur in different embodiments. In some embodiments, the information may correspond to a service provider's name; however in other embodiments an identifier of the service provider, e.g., a pre-assigned ID number may be provided that in turn can be used to index into a lookup table within the cellular telephone to obtain the name of the service provider.

Still referring to FIG. 2, at diamond 120 a determination can be made as to whether an intra-service provider call is occurring. This determination may be based on the incoming service provider information and a stored indication of the receiving party's service provider. In an embodiment, this service provider information can be stored in a configuration storage of the mobile station.

As further seen in FIG. 2, if it is determined that the call is not an intra-service provider call, control passes to diamond 130. At diamond 130 it can be determined whether the receiving party has an unlimited calling package. Although the scope of the present invention is not limited in this regard, in one embodiment this determination may be made based on information obtained by performing a query from the mobile station to the MTSO to access an entry of a billing database associated with the receiving party. If the user in fact has an unlimited package, control passes to block 160 where the service provider information can be displayed on a display of the mobile station. For example, this information may be provided along with caller ID information and the calling party's phone number. In addition to indicating the identity of the service provider, an additional display may be made with an indication that the call is free. Note that this indication can take many different forms. However, such display may be optional in some embodiments.

If instead at diamond 130 it is determined that the receiving party does not have an unlimited calling package, control passes to block 140 where the service provider information can be displayed along with optional usage monitoring information. This usage monitoring information may be in one embodiment an indication that the call is subject to the receiving party's service or billing plan. In one embodiment, a time mechanism can be displayed to decrement minutes from an allocation as the time of the phone call proceeds. Alternately, a simple indication of the inter-service provider call may be displayed such as providing a name of the initiating party's service provider and an indication that the user will be charged for the call. In the case where the service providers are the same, or where two different service providers have an agreement that calls between networks are "free", instead of providing the service provider name, a simple indication of "same service provider" or "in-network" may be communicated. Or where the service providers are different, the indication may read "out-of-network. In another example, a simple indication of a cost status of the call (e.g., free or not) can be displayed.

Still referring to FIG. 2 if instead at diamond 120 it is determined that the call is an intra-operator call, control passes to diamond 150 where it can be determined whether the receiving party has free intra-operator calling. If not, control passes to block 140 discussed above. Otherwise, control passes to block 160 also discussed above.

Note that variations are possible. For example, the determinations and display of information described above is with regard to an intra/inter-wireless service provider situation. Similar determinations can be made as to whether the incoming call is from a cellular provider or is initiated from a land line-based telephone and a landline service provider. Such determinations can be made in situations where a given user's calling plan is such that all mobile calls are free, but not landline-based calls. Also, understand that the method of FIG. 2 may similarly be performed on an initiating party's mobile device. To this end, the mobile station of the originating party may communicate a request to obtain service provider information for the terminating party. Note it is also possible to obtain the information through a sideband such as wireless local area network (WLAN) (for a voice over Internet protocol (VoIP) call, for example) from a central service, which maps the phone's location to the local emergency service number(s). In one such embodiment, the MSC for the initiating party may obtain this information based on its direction of the call to the MSC for the terminating party. Or the information can be obtained from further downstream, such as the MSC of the terminating party, or the mobile station of the terminating party itself or from other possible sources such as a home location register (HLR) or visitor location register (VLR). In a different schema of information exchange, some protocols like session initiation protocol (SIP) may be used to determine the terminating party device capability via device capability negotiation and alongside the device capability, a device user network can be accessed and populated in a contacts address book, as well as published to a display in an active live call.

On receipt of this service provider information in the mobile station of the initiating party, a similar method as described above with regard to FIG. 2 can be performed to thus enable a display of the service provider information of the terminating party.

Also, in situations in which service provider and/or standards do not provide this service provider identification functionality, an application executing on a mobile station can cause a message to be sent out-of-band (e.g., using data connections over transmission control protocol/Internet protocol (TCP/IP) to include the service provider of the caller/callee.

In addition, understand that the types of information displayed as well as actions that may be taken based on the determinations made can vary based on user configuration. For example, a user can be enabled to configure display of different information with regard to service provider and usage information. Examples of such actions can include providing a user the ability to reject an incoming call in situations of an inter-service provider call. Or, in another implementation such a mechanism can be provided when the call is an inter-service provider call and where the receiving party does not have any available allocated minutes for such calls. Although shown at this high level in the embodiment of FIG. 2, understand the scope of the present invention is not limited in this regard.

Figure 3:
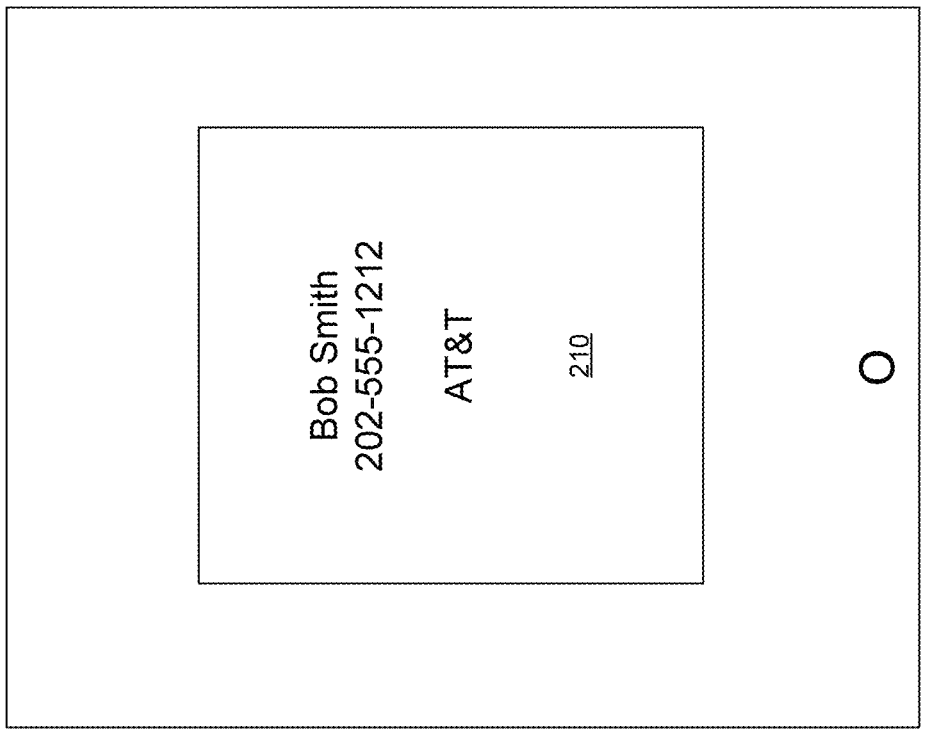
FIG. 3 is an example illustration of a mobile phone display in accordance with an embodiment of the present invention.

Referring now to FIG. 3, shown is an example illustration of a mobile phone display in accordance with an embodiment of the present invention. As shown in FIG. 3, mobile device 200, which may be any type of cellular phone, smartphone or other wireless communicator includes a display 210 which in an embodiment can be a liquid crystal display (LCD) or other type of display. When an incoming call is received various call information can be displayed on the display. In the example shown, caller ID information, including a name of the caller, the caller's telephone number, and the caller's service provider all can be displayed. Note that using an embodiment of the present invention, different manners of displaying the service provider can be effected. In the example shown, a simple text-based name is shown. In other implementations, this simple text display can be augmented with an icon for the service provider. Or, instead of actual indication of the service provider, a simple in-network or out-of-network message can be displayed. Still further, note that different colors may be used depending on whether the call is free (according to a service plan) or is subject minute allocation. For example, the service provider information can be displayed in a first color (e.g., green) when the call is in-network or is not subject to charge against a service plan, and instead in a second color (e.g., red) to indicate that the call is out-of-network or otherwise subject to charging against a service plan. Of course other configurations regarding the type of information and actions to be taken responsive to receipt of an incoming call from an intra or inter-service provider call can occur. Other display icons may be present in certain situations such as Call is Free, Call is Charged, Unknown Service Provider, Minutes Left in Package, etc.

Figure 4:
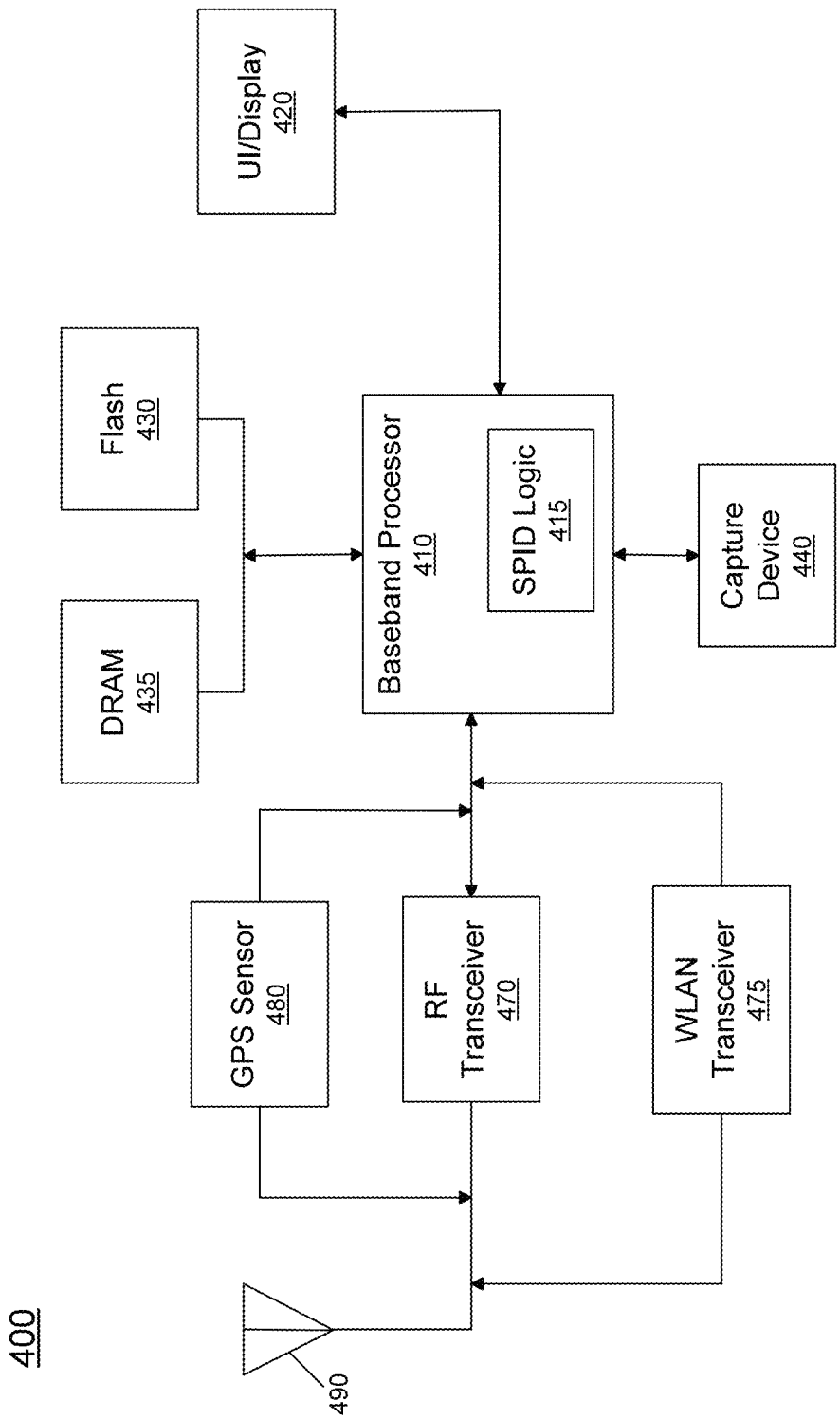
FIG. 4 is a block diagram of an example system with which embodiments can be used.

Embodiments can be used in many different environments. Referring now to FIG. 4, shown is a block diagram of an example system 400 with which embodiments can be used. As seen, system 400 may be a smartphone or other wireless communicator. As shown in the block diagram of FIG. 4, system 400 may include a baseband processor 410 which can include a service provider identification logic 415 or other logic to enable display of service provider information associated with a far end calling/called party, as described herein. In general, baseband processor 410 can perform various signal processing with regard to communications, as well as perform computing operations for the device. In turn, baseband processor 410 can couple to a user interface/display 420 which can be realized, in some embodiments by a touch screen display that can provide caller information, including an identification of a service provider of the far end party. In addition, baseband processor 410 may couple to a memory system including, in the embodiment of FIG. 4 a non-volatile memory, namely a flash memory 430 and a system memory, namely a dynamic random access memory (DRAM) 435. As further seen, baseband processor 410 can further couple to a capture device 440 such as an image capture device that can record video and/or still images.

To enable communications to be transmitted and received, various circuitry may be coupled between baseband processor 410 and an antenna 490. Specifically, a radio frequency (RF) transceiver 470 and a wireless local area network (WLAN) transceiver 475 may be present. In general, RF transceiver 470 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 480 may be present. Other wireless communications such as receipt or transmission of radio signals, e.g., AM/FM and other signals may also be provided. In addition, via WLAN transceiver 475, local wireless signals, such as according to a Bluetooth™ standard or an IEEE 802.11 standard such as IEEE 802.11a/b/g/n can also be realized. Although shown at this high level in the embodiment of FIG. 4, understand the scope of the present invention is not limited in this regard. For example, in other embodiments the handling of service provider information as described herein can be performed in another processor of a system such as one or more of a general purpose processor, digital signal processor (DSP) or other processing device.

The following examples pertain to further embodiments. In an embodiment, a system includes a processor to process data received from a remote location. The processor includes a service provider identification logic to receive service provider identification information obtained from setup data for an incoming call, where this information is to identify a service provider of an initiating party of the incoming call. The processor can cause display of identifying information of the initiating party service provider on a display. The display is coupled to the processor to display the initiating party service provider identifying information along with identifying information of the initiating party. The system may also include an antenna to communicate wirelessly with a base station and the initiating party.

The system is to communicate a first query to a mobile switching center (MSC) to request information regarding a service plan of a user of the system, where this service plan information includes an indication of whether a service plan of the user allows for unlimited inter-service provider calling.

In an embodiment, the service provider identification logic is to determine, based at least in part on the service provider identification information, whether the service provider of the initiating party is the same as a service provider of the terminating party, and if so, display a first indicator on the display, otherwise display a second indicator on the display.

The system can communicate a request for an identification of a service provider of a remote terminating party to which a user of the system has initiated a call.

The service provider identification logic may cause a display of identifying information of the remote terminating party service provider on the display, responsive to receipt of the remote terminating party service provider identification, received responsive to the request.

In another embodiment, a method includes receiving, in a mobile station of a terminating party, an incoming call and an identifier of a service provider of an initiating party of the incoming call and displaying information corresponding to the initiating party service provider on a display of the mobile station based at least in part on the service provider identifier.

The method may further include determining, based at least in part on the service provider identifier, whether the service provider of the initiating party is the same as a service provider of the terminating party and if so, displaying a first indicator on the mobile station display, otherwise displaying a second indicator on the mobile station display.

The first indicator may include a name of the initiating party service provider and an indication that the incoming call is free, based at least in part on a service plan of the terminating party. In turn, the second indicator may include a name of the initiating party service provider and an indication that a time of the incoming call is to be deducted from a time allocation of a service plan of the terminating party.

The method may further include displaying the time allocation and decrementing the time allocation on the mobile station display while the incoming call proceeds.

The method further may include issuing a query from the mobile station to a mobile switching center of the terminating party service provider for information regarding the service plan.

The method may further include determining whether the service provider of the initiating party is the same as the service provider of the terminating party in a mobile switching center of the terminating party service provider.

The service provider identifier may be inserted in the incoming call via a mobile switching center of one of the initiating party service provider and a service provider of the terminating party, in an embodiment.

In an embodiment, an identifier of a service provider of the terminating party is communicated to a mobile station of the initiating party.

The method may further include enabling the terminating party to reject the incoming call responsive to a determination that the initiating party service provider and a service provider of the terminating party are different and the terminating party has exceeded a time allotment of a service plan of the terminating party.

In another embodiment, at least one computer-readable storage medium includes instructions that when executed enable a mobile station to: receive, in a mobile station of a terminating party, an incoming call and an identifier of a service provider of an initiating party of the incoming call; and display, on a display of the mobile station, an indication of a cost status of the incoming call based at least in part on the initiating party service provider identifier.

The computer-readable storage medium may further include instructions that enable the mobile station to: determine, based at least in part on the initiating party service provider identifier, whether the service provider of the initiating party is the same as a service provider of the terminating party; and if so, display a first indicator on the mobile station display, otherwise display a second indicator on the mobile station display.

The computer-readable storage medium may further include instructions that enable the mobile station to display a time allocation available to the terminating party and decrement the time allocation on the mobile station display while the incoming call proceeds.

The computer-readable storage medium may further include instructions that enable the mobile station to communicate a request for an identification of a service provider of a remote terminating party to which a user of the mobile station has initiated a call.

In another embodiment, a method includes receiving, in a first MSC of a first service provider, a call to be communicated to a subscriber of the first service provider and a system identifier of an originating MSC associated with an originating party of the call, embedding the originating MSC system identifier in setup data for the call, and communicating the setup data to a mobile station of the subscriber.

The method may further include embedding the originating MSC system identifier using a service provider identification logic of the first MSC.

The method may further include communicating the setup data on a paging channel.

The method may further include receiving a request from the originating MSC for a system identifier of the mobile station.

The method may further include communicating the mobile station system identifier from the first MSC to a second mobile station of the originating party.

The computer-readable storage medium may further include instructions that enable the mobile station to display of a name of the remote terminating party service provider on the display, responsive to receipt of the remote terminating party service provider identification, received responsive to the request.

Embodiments may be implemented in code and may be stored on a non-transitory storage medium having stored thereon instructions which can be used to program a system to perform the instructions. The storage medium such as at least one computer-readable medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a processor to process data received from a remote location, the processor including a service provider identification logic, responsive to an application executed on the processor, to receive service provider identification information embedded in setup data for an incoming call and received in a broadcast page message from a mobile switching center of a terminating party via a paging channel, the service provider identification information to identify a service provider of an initiating party of the incoming call, wherein the processor is to cause display of identifying information of the initiating party service provider on a display; and
    the display coupled to the processor, to display the initiating party service provider identifying information along with identifying information of the initiating party, wherein the system, responsive to the application, is to communicate a first query to the mobile switching center to request information regarding a service plan of a user of the system corresponding to the terminating party, the service plan information including an indication of whether a service plan of the user allows for unlimited inter-service provider calling.

2. The system of claim 1, wherein the service provider identification logic is to:
    determine, based at least in part on the service provider identification information, whether the service provider of the initiating party is the same as a service provider of the terminating party; and
    if so, display a first indicator on the display, otherwise display a second indicator on the display.

3. The system of claim 1, wherein the system is to communicate a request for an identification of a service provider of a remote terminating party to which the user of the system has initiated a call.

4. The system of claim 3, wherein the service provider identification logic is to cause a display of identifying information of the remote terminating party service provider on the display, responsive to receipt of the remote terminating party service provider identifying information, received responsive to the request.

5. The system of claim 1, further comprising an antenna to communicate wirelessly with a base station, wherein the processor is coupled to the antenna to receive the data from the remote location.

6. A method comprising:
    receiving, in a mobile station of a terminating party, an incoming call and an identifier of a service provider of an initiating party of the incoming call included in a broadcast page message received from a mobile switching center of the terminating party, via a paging channel;
    communicating a first query to the mobile switching center to request information regarding a service plan of the terminating party, the service plan information including an indication of whether a service plan of the terminating party allows for unlimited inter-service provider calling; and
    displaying information corresponding to the initiating party service provider on a display of the mobile station based at least in part on the service provider identifier.

7. The method of claim 6, further comprising:
    determining, based at least in part on the service provider identifier, whether the service provider of the initiating party is the same as a service provider of the terminating party; and
    if so, displaying a first indicator on the mobile station display, otherwise displaying a second indicator on the mobile station display.

8. The method of claim 7, wherein the first indicator includes a name of the initiating party service provider and an indication that the incoming call is free, based at least in part on the service plan of the terminating party.

9. The method of claim 7, wherein the second indicator includes a name of the initiating party service provider and an indication that a time of the incoming call is to be deducted from a time allocation of the service plan of the terminating party.

10. The method of claim 9, further comprising displaying the time allocation and decrementing the time allocation on the mobile station display while the incoming call proceeds.

11. The method of claim 7, further comprising determining whether the service provider of the initiating party is the same as the service provider of the terminating party in the mobile switching center of the terminating party service provider.

12. The method of claim 6, wherein the service provider identifier is inserted in the incoming call via a mobile switching center of one of the initiating party service provider and a service provider of the terminating party.

13. The method of claim 6, further comprising communicating an identifier of a service provider of the terminating party to a mobile station of the initiating party.

14. The method of claim 6, further comprising enabling the terminating party to reject the incoming call responsive to a determination that the initiating party service provider and a service provider of the terminating party are different and the terminating party has exceeded a time allotment of the service plan of the terminating party.

15. At least one computer-readable non-transitory storage medium including instructions that when executed enable a mobile station to:
    receive, in a mobile station of a terminating party, an incoming call and an identifier of a service provider of an initiating party of the incoming call included in a broadcast page message received from a mobile switching center of the terminating party, via a paging channel;
    communicate a first query to the mobile switching center of the terminating party to request information regarding a service plan of a user of the mobile station corresponding to the terminating party, the service plan information including an indication of whether a service plan of the user allows for unlimited inter-service provider calling; and
    display, on a display of the mobile station, an indication of a cost status of the incoming call based at least in part on the initiating party service provider identifier.

16. The at least one computer-readable non-transitory storage medium of claim 15, further comprising instructions that enable the mobile station to:
    determine, based at least in part on the initiating party service provider identifier, whether the service provider of the initiating party is the same as a service provider of the terminating party; and
    if so, display a first indicator on the mobile station display, otherwise display a second indicator on the mobile station display.

17. The at least one computer-readable non-transitory storage medium of claim 15, further comprising instructions that enable the mobile station to display a time allocation available to the terminating party and decrement the time allocation on the mobile station display while the incoming call proceeds.

18. The at least one computer-readable non-transitory storage medium of claim 15, further comprising instructions that enable the mobile station to communicate a request for an identification of a service provider of a remote terminating party to which a user of the mobile station has initiated a call.

19. The at least one computer-readable non-transitory storage medium of claim 18, further comprising instructions that enable the mobile station to display identifying information of the remote terminating party service provider on the display, responsive to receipt of the remote terminating party service provider identification, received responsive to the request.

* * * * *